United States Patent [19]

Gastambide et al.

[11] 3,925,480

[45] Dec. 9, 1975

[54] NOVEL 16,17α AND 17,17α DIKETO-D-HOMOSTEROIDS AND THEIR METHOD OF PREPARATION

[75] Inventors: Bernard Gastambide, Reims; Claude Thal, Gif-sur-Yvette; Philippe Rohrbach, Paris; Marie-Jeanne Laroche, Nogent-sur-Marne, all of France

[73] Assignee: Etablissement public: Centre National de la Recherche Scientifique, Paris, France

[22] Filed: Mar. 23, 1967

[21] Appl. No.: 625,312

[30] Foreign Application Priority Data

Mar. 31, 1966 France .............................. 66.55903
June 27, 1966 France .............................. 66.67026
Mar. 6, 1967 France .............................. 67.97572

[52] U.S. Cl. .......... 260/586 E; 260/566 A; 260/590; 424/331
[51] Int. Cl.² ......................................... C07C 49/48
[58] Field of Search ...................... 260/586 H, 590

[56] References Cited
OTHER PUBLICATIONS

Thal et al., Bull. Soc. Chim. France 1966, (Apr.), pp. 1222–1227.

Nelson et al., J. Am. Chem. Soc., Vol. 81, pp. 6486–6490 (1959).

Romo et al., J. Org. Chem. 21, pp. 902–909 (1956).

Bernd Eistert et al., Am. 659, pp. 64–69 (1962).

*Primary Examiner*—Gerald A. Schwartz
*Attorney, Agent, or Firm*—Berman, Aisenberg & Platt

[57] ABSTRACT

This invention provides novel 16,17α- and 17,17α-diketo-D-homosteroids, and a method for their preparation from corresponding 16,17-diketo-steroids by reaction with diazoalkanes. Typical novel compounds according to the invention are 3-methoxy-16,17α-diketo-D-homoestratriene-1,3,5(10) and 3β-hydroxy-17,17α-diketo-D-homo-androstene. Such compounds have utility as synthetic intermediates, and also have valuable pharmacodynamic properties. Pharmaceutical compositions containing these novel compounds are also provided, having useful hypocholesterolemic and hypolipidemic activity.

9 Claims, No Drawings

NOVEL 16,17 α AND 17,17 α DIKETO-D-HOMOSTEROIDS AND THEIR METHOD OF PREPARATION

The present invention relates to novel 16,17α- and 17,17α-diketo-D-homosteroids, to a process for their preparation, and to their use in pharmaceutical compositions.

The novel compounds of the invention have the following general formula (I):

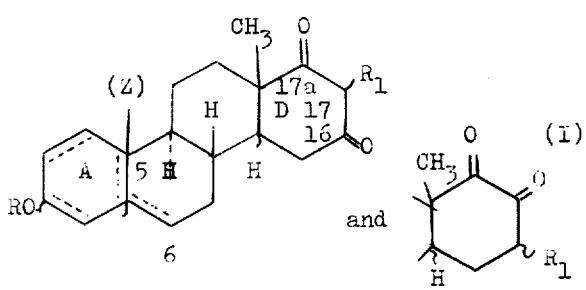

wherein
the ring A may be saturated or aromatic;
the radicals R and $R_1$, which may be the same or different, are hydrogen atoms or lower alkyl radicals;
the substituent Z, which is not present when the ring A is unsaturated, is a hydrogen atom or a methyl radical;
the 5,6 bond may be double when the ring A is saturated.

In the general formulae used in the instant specification the undulating bonds (∼) indicate, as is conventional, that the substituents in question may be either α- or β- oriented. The compounds of formulae (I) are, alternatively, represented by the following formulae:

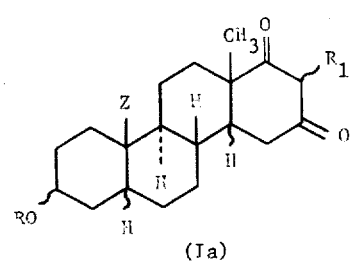
(Ia)

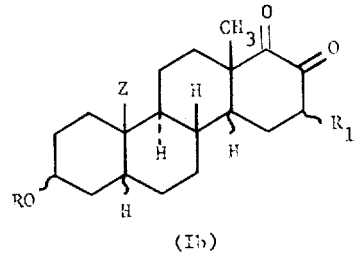
(Ib)

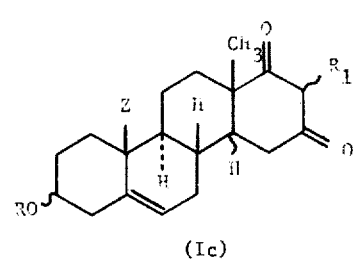
(Ic)

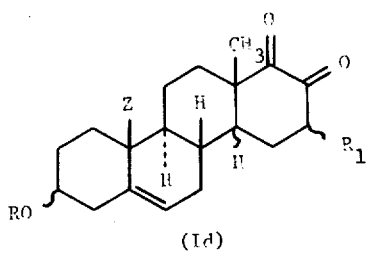
(Id)

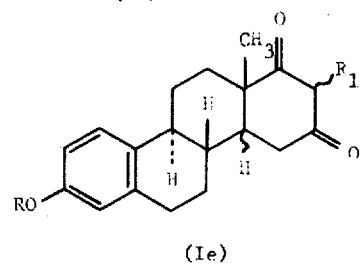
(Ie)

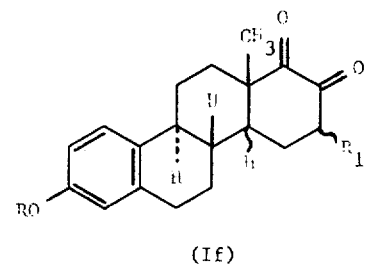
(If)

wherein R, $R_1$, Z and the undulating bonds have their aboveascribed meanings.

The process according to the invention consists essentially in reacting a diazoalkane of the formula:

$$R_1 — CH=N_2 \qquad (II)$$

in which $R_1$ is either hydrogen or a lower alkyl radical, with a 16,17-diketosteroid of the following general formula:

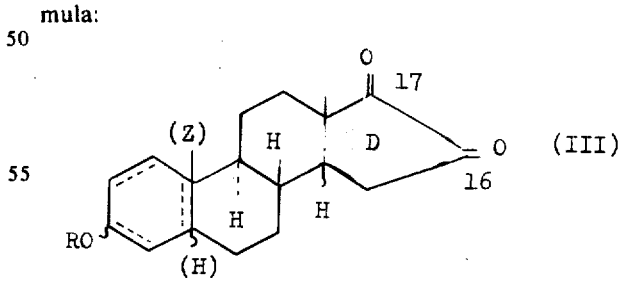

in which R, Z have the meanings given in (I), in an alkaline alcoholic solution, and separating the products.

In this reaction, the isomeric 16,17α-diketo-and 17,17α-diketo-D-homosteroids are, in general, both formed, and it is therefore necessary to separate the two isomers. This is preferably done by taking up the products an aqueous solvent, extracting with a suitable organic solvent, and separating the aqueous and organic layers. The desired 16,17α-diketo-D-homosteroid is collected by acidification of the aqueous layer and the 17,17α-diketo-D-homosteroid by evaporation of the neutral organic layer.

The source of diazoalkane preferably used is a nitrosoalkylurea; it is a well-known technique to liberate the diazoalkane in situ from such a source. The diazoalkane may alternatively be used dissolved in a suitable organic solvent, such as ether.

The alkaline alcoholic solution is preferably methanolic potassium hydroxide.

The reaction with the diazoalkane is preferably carried out with agitation for about 2 hours at a temperature between +5° and −10°C, most preferably at a temperature close to −5°C.

After the mixture has been allowed to stand until it has returned to ambient temperature, it is taken up with water.

The solvent used for extraction is preferably ether.

Acidification of the aqueous layer to a pH between 2 and 3 is preferably effected with the aid of an organic or mineral acid, such as phosphoric or hydrochloric acid;

The separated isomers are subsequently purified by the usual means, such as successive recrystallisations from suitable solvents.

The derivatives of the general formula (III) are themselves obtained from 17-ketosteroids of the formula:

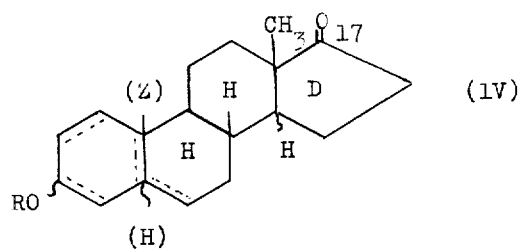

(IV)

(II)

in which R, and Z, have the meanings given above, by transformation of the cyclopentane ring D in accordance with the following scheme:

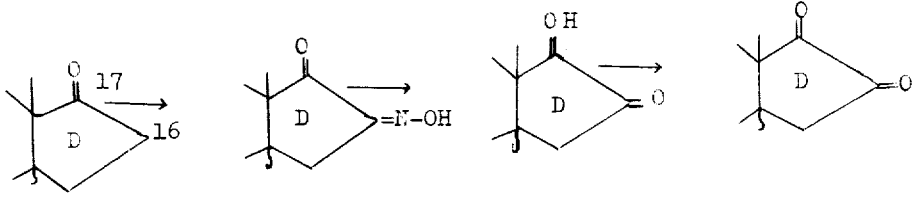

The compounds provided by the present invention and having the general formula (I) have numerous applications in industry as raw materials for synthesis, because of the great reactivity of their ring D.

The following examples have no restrictive character.

EXAMPLE I:

Preparation of 3β-hydroxy-16,17α-diketo-D-homo-androstene-5 and 3β-hydroxy-17,17α-diketo-D-homo-androstene-5.

A solution of 2.5 g of 3β-hydroxy-16,17-diketo-androstene-5 of the formula:

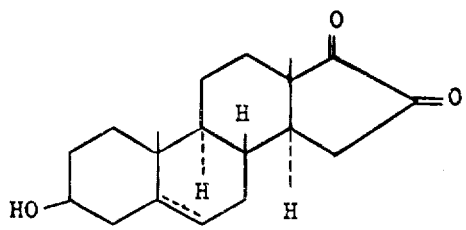

in 19.5 ml of methanol was placed in a balloon flask, and the mixture equilibrated at a temperature between −7° and 0° C before adding 8 ml of cold 50% methanol containing 2.7 g of potassium hydroxide. 2.9 g of nitrosomethylurea were then added over a period of about two hours, with agitation and while maintaining the reaction medium at a temperature close to −5°C. After allowing the reaction medium to return to ambient temperature, it was poured into water and extracted twice with ether.

1. The aqueous layers, acidified to pH 2–3 with phosphoric acid, yielded 1.4 g of product (yield = 53%), Mp = 229°–236°, isolated by centrifuging. After purification on Norit vegetable charcoal and recrystallisation several times from methanol, 3β-hydroxy-16,17α-diketo-D-homo-androstene-5 was obtained.

The characteristics of this compound are as follows: Mp = 269°–270°, $[\alpha]_D^{20} = -162°$ (methanol; c = 0.380 g/100 ml).

Analysis: $C_{20}H_{28}O_3$ Calculated: percentage C: 75.91;H: 8.92. Found: percentage 75.90; 9.16. I.R. spectrum: (KBr) 2650,2550 cm$^{-1}$ (OH assoc.); 1615, 1575. (C=O assoc. + C = COH): (nujol) 2650, 2550, 1612, 1582 cm$^{-1}$ U.V. spectrum: (alcohol) 256 mμ (logε=4.22);(alcohol + HCl) 256mμ (logε = 4.23); (alcohol + KOH)284 mμ (logε = 4.43); dioxane 246 mμ (logε = 4.07).

2. After washing with water and evaporation the ethereal layers yielded 1 g of a crude oily product which, when recrystallised from 16 parts of methanol, furnished 460 mg of 3β-hydroxy-17,17α-diketo-D-homo-androstene-5 (yield = 17%), Mp. = 225°–226°. The pure sample was obtained after additional recrystallisations from 22 parts of a 6:1 mixture of methylene chloride and methanol, and then from 15 parts of methylene chloride.

The characteristics of this compound are as follows: Mp. = 227°, 5-228°; $[\alpha]_D^{20} = -157°$ (CHCl$_3$; c=1.15 g/100 cubic cm); test with FeCl$_3$ in ethanol positive.

Analysis: $C_{20}H_{28}O_3$ Calculated:percentage C: 75.91;H: 8.92. Found: percentage 75.44 8.83. I.R. spectrum (BrK): 1680, 1640 cm$^{-1}$. U.V. spectrum (alcohol) 268 mμ (logε = 3.86); (alcohol + KOH)312 mμ(logε = 3.57). N.M.R. spectrum: (CDCl$_3$) quadruplet centred at 6.02 ppm. (hydrogen at position in the enolic form).

EXAMPLE II:

Preparation of 3β-hydroxy-16,17α-diketo-D-homo-androstane and 3β-hydroxy-17,17α-diketo-D-homo-androstane.

A solution of 2.5 g of 3β-hydroxy-16,17-diketo-androstane of the following formula:

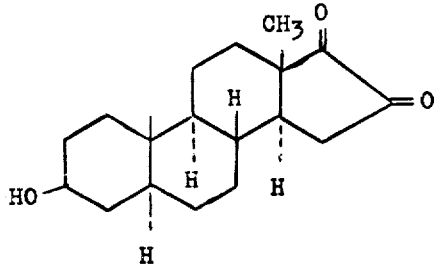

in 19.5 ml of methanol was placed in a balloon flask and equilibrated at a temperature between −7° and 0° C before adding 8 ml of cold 50% methanol containing 2.7 g of potassium hydroxide. 2.9 g of nitrosomethylurea were then added over a period of about two hours, with agitation and while maintaining the reactional medium at a temperature close to −5°C. After the reactional medium had been allowed to return to ambient temperature, it was poured into water and extracted twice with ether.

1. A crude product, Mp = 230°–240°C was isolated, with a yield close to 50%, from the aqueous layers. After recrystallising four times from 30 parts of dioxane and three times from 20 parts of methanol, 3β-hydroxy-16,17α-diketo-D-homo-androstane was obtained.

The characteristics of this compound are as follows: Mp. = 277°–278°; $[α]_D^{20}$ = −61° ($CH_3OH$; c=0.93 g/100 ml) Analysis $C_{20}H_{30}O_3$ Calculated:percentage C: 75.43; H: 9.50. Found: percentage 75.18 9.36. I.R. spectrum: (KBr) 2600, 2550 $cm^{-1}$ (OH assoc.); 1620 (C=O, C=COH); (nujol) 2650, 2550, 1620 $cm^{-1}$ U.V. spectrum:(alcohol) 256 mμ(logε = 4.19); (alcohol + HCl).

256 mμ(logε = 4.24); (alcohol + KOH)

284 mμ(logε = 4.42); (dioxane) 244 mμ (logε = 4.05);

2. The ethereal layers when subjected to recrystallisation from 20 parts of a 1:4 methanol-ether mixture produced 3β-hydroxy-17,17α-diketo-D-homo-androstane.

The characteristics of this compound are as follows: Mp. (with decomp.) = 218°–224°C. By successive recrystallisation from 45 parts of methanol and from 6 parts of chloroform, an analytical sample, Mp. = 228°–228.5° was obtained; $[α]_D^{20}$ = −27° ($CHCl_3$; c = 2.29 g/100 ml); $FeCl_3$ in ethanol test positive.

Analysis: $C_{20}H_{30}O_3$ Calculated: percentage C: 75.43; H: 9.50. Found: percentage 75.37 9.46. I.R. spectrum ($CHCl_3$): 1683, 1663 $cm^{-1}$ U.V. spectrum (alcohol) 266 mμ (logε = 3.80): alcohol + KOH 315 mμ (logε = 3.63) N.M.R spectrum ($CDCl_3$): centred quadruplet at 6.05 ppm (hydrogen at position 16 in the enolic form).

EXAMPLE III:

Preparation of 3-methoxy-16,17α-diketo-D-homo-estratriene-1,3,5(10) and 3-methoxy-16,17α-diketo-D-homo-estratriene-1,3,5(10).

A solution of 0.5 g of 3-methoxy-16,17α-diketo-estratriene-1,3,5(10) of the following formula:

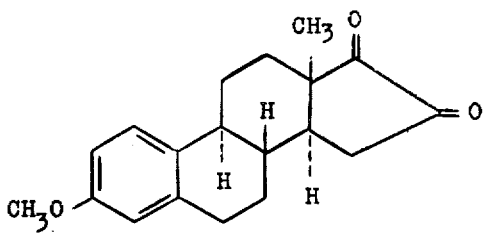

dissolved in 3.5 ml of chloroform and 9 ml of methanol was placed in a balloon flask; a previously cooled solution of 0.52 g of potash in 1.8 ml of 50% aqueous methanol was added. The temperature was maintained between −5° and 0° and 0.71 g of nitrosomethylurea was added with agitation over a period of two hours. The agitation was maintained for 1 hour at that temperature. The reaction medium was allowed to return to ambient temperature, and after the addition of water was extracted with ether.

1. The aqueous layers, acidified to pH 2–3 with phosphoric acid, yielded to 0.235 g of product (yield = 45%), Mp. = 221°–225°. After recrystallising 3 times from methanol and sublimation at 160° at 0.0001 mm pressure, 3-methoxy-16,17α-diketo-D-homo-estratriene-1,3,5(10) was obtained.

The characteristics of this compound are as follows: Mp. = 230°–232°; $[α]_D^{20}$ = +31° ($CH_3OH$; c = 0.40 g/100 ml).

Analysis: $C_{20}H_{24}O_3$ Calculated:percentage C: 76.89: H: 7.74. Found: percentage 76.74 7.70. I.R. spectrum: (KBr or nujol) 2650–2550 (OH assoc.); 1620 and 1590 $cm^{-1}$ (C=O assoc. + C = COH). U.V. spectrum: (alcohol 282 mμ (logε = 4.23); (alcohol+HCl) 256 mμ (logε = 4.20); (alcohol + KOH) 282 mμ (logε = 4.38); (dioxane) 245 mμ (logε = 4.0).

2. After washing with water the organic layers yielded 0.290 g of crude product, Mp. = 100°–110°, which was found to be a mixture of at least four compounds. By effecting repeated recrystallisations from methanol, only a mixture of two compounds (Mp. = 145°–147°), was isolated, giving a violet colouration with ferric chloride dissolved in ethanol. By preparative chromatography on a thin layer, a slightly impure compound was isolated, which had the following characteristics:

Mp. = 155°–160°; test with $FeCl_3$ in ethanol positive. I.R. spectrum ($CHCl_3$): 1685 and 1670 $cm^{-1}$; U.V. spectrum (alcohol): 270 mμ (logε = 3.69); (alcohol+λ KOH) 312 mμ (logε = 3.60).

This compound must have a diosphenolic structure, similar to that of the 17–17α diketone compounds described in Examples I and II, namely Δ⁵ epiandrosterone and epiandrosterone.

The steroids according to the invention have numerous applications in industry as starting materials for syntheses because of the great reactivity of their D cycle; these steroids are medicaments having in particular hypocholesterolemic and normolipidemic activities.

The pharmacological study of the steroids according to the invention has shown their interesting properties; 3-methoxy-16,17α-diketo-D-homo-estratriene-1,3,5(10) called in the following Bo 771, has been particularly studied.

A. Bringing out the hypocholesterolemic activity

This study was made on the female Rat comparatively to the methyl ether of 16α-chloro-estrone.

The two products were given orally, in aqueous suspension, for 3 consecutive days in doses of 5 mg/kg and 20 mg/kg (5 animals per dose + control batch).

Blood samples were taken on the 4th day from the abdominal aorta and the total cholesterol was determined by the method of ZLATKISS and ZAK (J. Lab. Clin. Med. 1953,41, 486–492).

The results have been assembled in Table I hereunder.

TABLE I

| Product | Dose mg/kg | % fall in total cholesterol |
|---|---|---|
| Methyl ether of 16α-chloro-estrone | 5 | 50 |
|  | 20 | 62 |
| Bo 771 | 5 | 49 |
|  | 20 | 68 |

The animals were then sacrificed and the following organs removed and weighed: adrenals, thymus, uterus and ovaries.

TABLE II

| Product | Dose mg/kg | adrenals* | thymus* | uterus ovaries* |
|---|---|---|---|---|
| Controls | — | 25 | 86 | 256 |
| Methyl ether of 16α-chloro estrone | 20 | 24 | 91 | 243 |
| Bo 771 | 20 | 27 | 82 | 228 |

(*the weight of the fresh organs is given in mg/100g of the weight.)

It can be thus noticed that already with a dose of 5 mg/kg the product according to the invention provokes an important lowering of the cholesterolemia without modifying the weight of the adrenal organs and thymus. The non-increase of the weight of the uterus and ovaries implies a lack of estrogen effect, which will be confirmed in paragraph B) hereunder.

B. Search for an estrogen activity

It was carried out on the impuberal mouse according to the method of Rubin and coll (Endocrinology 49, 429, 1951) comparatively to the estrone. The two derivatives were given by a subcutaneous method in an olive oil solution (estrone) or in suspension in this same solvent (Bo 771) for 3 consecutive days. The animals were sacrificed on the fourth day and the uteruses were taken and weighed. The results are compiled in Table III.

TABLE III

| Product | Dose given | Weight of uteruses in mg/100g of body weight |
|---|---|---|
| Controls | — | 84 |
| Estrone | 0.12 μg | 210 |
|  | 0.24 μg | 266 |
| Bo 771 | 0.12 μg | 88 |
|  | 0.24 μg | 84 |

The non-increase of the uteruses' weight of the animals receiving Bo 771 confirms the lack of estrogen symptoms of the derivative of the invention.

C. Search for an inhibiting effect on growth

It is known that the estrogen derivatives can provoke a reduction of the secretion of the growth hormone by the hypophysis. The search for this inconveniant secondary effect was effected by comparatively using the methyl ether of 16α-chloro-estrone. Batches of 5 male and female rats 6 weeks old were used. These rats received, orally, for 5 days per week for 2 weeks, doses of 0.5 mg/kg, 5 mg/kg and 20 mg/kg of product in suspension in gum arabic at 10% under a volume of 1 ml/100g.

The controls received the suspension of gum only. The animals were weighed on the 6th and 10th days of the experiment.

The results have been compiled in Table IV.

TABLE IV

| Time of treatment | Product | Dose mg/kg | % increase in weight (male rats) | % increase in weight (female rats) |
|---|---|---|---|---|
|  | controls | — | 35 | 25 |
| 1st WEEK | Methyl ether of 16α-chloro estrone | 0.5 | 34 | 26 |
|  |  | 5 | 33 | 20 |
|  |  | 20 | 9 | 8 |
|  | Bo 771 | 0.5 | 38 | 29 |
|  |  | 5 | 33 | 23 |
|  |  | 20 | 29 | 17 |
|  | Controls | — | 51 | 42 |
| 2nd WEEK | Methyl ether of 16α-chloro estrone | 0.5 | 47 | 38 |
|  |  | 5 | 44 | 25 |
|  |  | 20 | 19 | 10 |
|  | Bo 771 | 0.5 | 57 | 43 |
|  |  | 5 | 49 | 34 |
|  |  | 20 | 40 | 24 |

It can be seen that in the males as well as the females, the doses of 0.5 and 5 mg/kg of Bo 771 do not influence the growth whereas there is a slight checking with 5 mg/kg of methyl ether of 16α-chloro-estrone. This last product is clearly growth inhibiting at the dose of 20 mg/kg, whereas Bo 771 for the same dose provokes only a beginning of checking.

These results confirm, in addition to the good toleration of the derivative studied, the absence of estrogen effect.

D. Search for toxicity

The animals having received, in the hereinabove described experiments, daily doses of 20 mg/kg, showed no symptoms of toxicity. No death was noticed. It was the same with animals having received daily 50 mg/kg for a week.

These interesting hypocholesterolemic and normolipidemic properties and the lack of inconvenient secondary symptoms make the derivatives according to the invention useful medicaments for the treatment of hypercholesterolemias which are essential or entrained by affections accompanied of perturbations of lipid metabolism as well as in the prevention and treatment of atheromatoses. Thus 3-methoxy-16,17α-diketo-D-homo-estratriene-1,3,5 (10) dispensed clinically has given very satisfactory results without the patients complaining of disagreable secondary effects.

The present invention has also for object different solid or liquid pharmaceutical forms to be given through different channels of administration in man and principally those to be given orally, such as simple compressed or sugar coated pills, pills which break up in the intestines, pills whose breaking up is delayed, jelly capsules, and comprising as active agents one or other of the derivatives according to the invention. These different forms are made with the excipients usually used in the chosen pharmaceutical form, starch, talc, magnesium stearate, lactose, resins, aqueous or oily vehicles, various emulsifying agents, adjuvants, preservatives and flavourings.

The active therapeutic doses vary according to the subject and seriousness of the cases. Usually, the daily oral dosage in man, is graduated between 1 mg and 100 mg.

There are given hereunder, not by way of limitation, examples of pharmaceutical compositions.

EXAMPLE 1

Pills which break up in the intestines were prepared having for formula:

| | |
|---|---|
| 3-methoxy-16, 17a-diketo-homo estratriene-1,3,5(10) | 0.003 g |
| lactose, starch, talc, magnesium stearate silica gel q.s.p. 1 core to make up to | 0.200 g |

These cores are then subjected to lacquering (10 layers) by turbine by means of a 12% solution of cellulose phthalate (T.N.Illegible)

EXAMPLE 2

Jelly capsules were prepared with the formula:

| | |
|---|---|
| 3-methoxy-16, 17a-diketo-homo estratriene-1,3,5(10) | 0.003 g |
| magnesium stearate | 0.002 g |
| lactose | 0.245 g |
| for one No. 3 jelly capsule | |

EXAMPLE 3

There were prepared in accordance with the art delay pills having the formula:

| | |
|---|---|
| 3-methoxy-16, 17a-diketo-homo estratriene-1,3,5(10) | 0.010 g |
| palmitostearic ester of glycerol | 0.045 g |
| lactose, starch, talc, magnesium stearate q.s.p. one pill made up to | 0.300 g |

The work described hereunder confirms the normolipidemic and hypocholesterolemic activity of Bo 771. This work has been carried out on the female rat, subjected to a hyperlipidic diet by comparison with the methyl ether of 16α-chloro-estrone.

Experimental procedure

Five batches of six Wistar female rats were fed for 15 days with a hyperlipidic and hypoprotidic diet particularly comprising 1% cholesterol and 18% olive oil.

Simultaneously, they were subjected to a treatment given by gastric probe in gummy suspension.

The animals were divided in the following way:

Batches No.:
1) control
2) methyl ether of 16 alpha-chloro-estrone
weak dose: 5 mg/kg for 3 days
and 2 mg/kg for 12 days
3) methyl ether of 16 alpha-chloro-estrone
strong dose 10 mg/kg for 3 days
and 5 mg/kg for 12 days
4) Bo 771
weak dose: 5 mg/kg for 3 days
and 2 mg/kg for 12 days
5) Bo 771
strong dose: 10 mg/kg for 3 days
and 5 mg/kg for 12 days At the end of the experiments the animals were sacrificed and determinations were carried out on the serum (total cholesterol, total lipids, Kunkel phenol test) and on the liver (total lipids).

Results

They have been compiled in the table hereunder. These results confirm the hypolipidemic and hypocholesterolemic actions of Bo 771, actions which are marked as soon as weak doses are administered.

| | | Activity related to the controls % | | | |
|---|---|---|---|---|---|
| | | Methyl Ether of 16α chloro-estrone | | Bo 771 | |
| Determinations | Hypercholes- terolemic controls | weak dose | strong dose | weak dose | strong dose |
| Serum Total choles- terol mg/100 ml | 125.2 | −15 | −32 | −36 | −30 |
| Total lipids g/l | 3.8 | −29 | −34 | −47.4 | −44.5 |
| Kunkel phenol U. Vernes | 35.4 | −35.6 | −10.7 | −54 | −52 |
| Liver(fresh) Total lipids g/100 g | 11.22 | −28.7 | −17.8 | −8.73 | −9 |

A study of chronic toxicity was carried out on the male rat for a duration of 5 weeks. The animals were divided into 3 batches of 12, receiving:
1. no treatment : control batch
2. methyl ether of 16 alpha-chloro- estrone :
   2mg/kg per day for 12 days, then
   5mg/kg per day for 14 days
3. same doses and same distribution of Bo. 771.

The derivatives are administered in aqueous suspension by means of a probang.

During the whole length of the treatment, a graph of the weight was established. At the end of the treatment, the hepatic and renal functions were studied. Finally, after sacrifice of the animals, the weights of the genital organs and adrenal glands were noted.

Results

The animals subjected to Bo 771 have a weight graph identical with that of the control animals, whereas those receiving the methyl ether of 16 alpha-chloro-estrone have a growth which is on average about 15% less.

The tests of hepatic and renal functions revealed no disturbances of these functions. The organs of the animals treated with Bo 771 did not undergo any morphological or weight modification in comparison with those of the controls, whereas a congested aspect and an increase in the weight of the adrenals of the animals receiving the methyl-ether of 16-alpha-chloro-estrone can be noticed.

The Bo 771 was tested clinically on patients suffering from atheromatous cholesterolemia. This study has made it possible to observe in man, on the one hand a very clear effect on the pathological rise in the rate of cholesterol, of the total lipids and of the beta-lipoproteins as might have been expected from the pharmacological study, but on the other hand an unexpected delay effect showing itself as a continuation in the fall of the cholesterolemia more than a month after the treatment had been stopped, as shown in the observation hereunder:

Mrs C . . . A . . . 67 years : diffused arteriosclerosis
   before treatment :
   total cholesterol : 5.20 g/l
   total lipids : 10.15 g/l
   phospholipids : 91
      (in mg of P/l)

She is given daily 4 jelly capsules containing 0.003 g of Bo 771 for 15 days and the preceding determinations then remade:
   total cholesterol : 3.70 g/l
   total lipids : 9.6 g/l
   phospholipids : 79
      (in mg of P/l)

The rate of blood cholesterol is determined again fifteen days after stopping the treatment:
   total cholesterol (g/l) 2.80

This interesting delay in the cholesterolemia was found again in other patients more than a month after stopping the treatment.

This unexpected property means that Bo 771 has a great advantage over the normocholesterolemic agents known at present. Indeed, it is known that the administration of the classical normolipidemic products to man has the effect of lowering his cholesterolemia, but that stopping the treatment has more often than not the corollary of stopping the decrease in that cholesterolemia; sometimes there is even observed a rebound phenomenon.

In the course of the clinical testing of Bo 771 this was never observed but, on the contrary, more than a month after the complete stoppage of the treatment, it was to be observed that the cholesterolemia continued to decrease clearly, tending to return towards normal. Finally, none of the subjects treated with Bo 771 showed side effects, in particular of the estrogenic type, or hepatic or allergic digestive intolerance.

The incidence of these interesting effects on the posology of Bo 771 means that the latter can be administered in spaced treatments, for example 3 to 12 mg per day for 15 days, followed by a stoppage of the treatment varying from one to two months depending on the case whereas, for the known products, the time of stoppage of the treatment does not exceed 10 to 15 days.

These precious properties make of 3-methoxy-16, 17α-diketo-D-homo-estratriene-1,3,5(10) a useful medicament in the treatment of hypercholesterolemias which are essential or entrained by affections accompanied by disturbance of the lipid metabolism as well as in the prevention and the treatment of atheromatoses; a medicament presented in the pharmaceutical forms and the active doses indicated hereinabove.

What is claimed is:
1. Diketo-D-homosteroid of one of the formulae

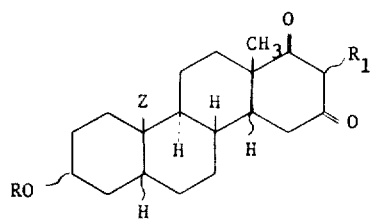 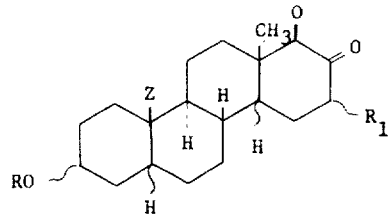

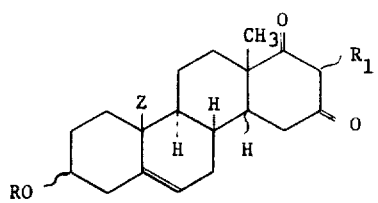 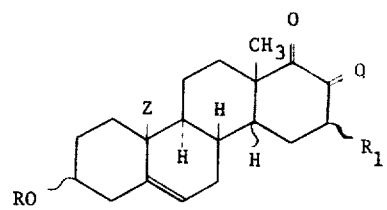

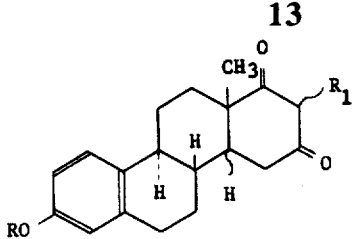 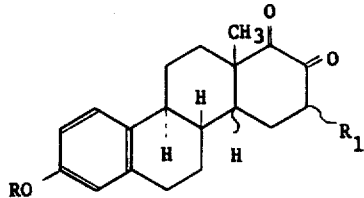

wherein each of

R and R₁ is, independently, a member selected from the group consisting of a hydrogen atom and lower alkyl; and Z is a member selected from the group consisting of a hydrogen atom and methyl.

2. The compound according to claim 1 which is 3β-hydroxy-16,17α-diketo-D-homo-androstene-5.

3. The compound according to claim 1 which is 3β-hydroxy-17,17α-diketo-D-homo-androstene-5.

4. The compound according to claim 1 which is 3β-hydroxy-16,17α-diketo-D-homo-androstane.

5. The compound according to claim 1 which is 3β-hydroxy-17,17α-diketo-D-homo-androstane.

6. A D-homoandrostanedione according to claim 1.

7. A 5-D-homoandrostenedione according to claim 1.

8. A D-homoestra-1,3,5(10)-trienedione according to claim 1.

9. 3-methoxy-16, 17α-diketo-D-homo-estratriene-1,3,5,-D-homoestra-1,3,5(10)-triene-16,17α-dione.

UNITED STATES PATENT OFFICE
CERTIFICATE OF CORRECTION

Patent No. 3,925,480          Dated December 9, 1975

Inventor(s) BERNARD GASTAMBIDE, CLAUDE THAL, PHILIPPE ROHRBACH and MARIE-JEANNE LAROCHE It is certified that error appears in the above-identified patent and that said Letters Patent are hereby corrected as shown below:

Title page, line 6 of the ABSTRACT, "1,3,5(10" should read --1,3,5(10)--. Column 1, line 50, in the formula, "CH$_3$" should read --CH$_3$--. Column 2, line 42, "abovescribed" should read --above-ascribed--; line 61, "R,Z" should read --R and Z--; line 68, "products an" should read --products in an--. Column 3, line 24, "acid;" should read --acid.--; line 50, the entire reaction should read

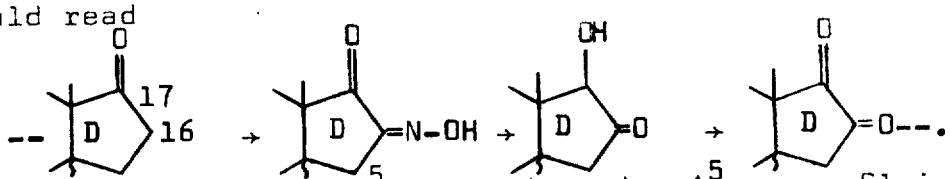

Column 6, line 57, "$\Delta^5$" should read --$\Delta^5$- --. Claim 9, lines 1 and 2, "3-methoxy ... D-homoestra" should read --3-methoxy-D-homoestra--.

Signed and Sealed this

Tenth Day of August 1976

[SEAL]

Attest:

RUTH C. MASON
Attesting Officer

C. MARSHALL DANN
Commissioner of Patents and Trademarks